United States Patent [19]

Simon

[11] Patent Number: 5,778,207
[45] Date of Patent: Jul. 7, 1998

[54] ASSISTING OPERATING-SYSTEM INTERRUPTS USING APPLICATION-BASED PROCESSING

[75] Inventor: Allen Henry Simon, Chandler, Ariz.

[73] Assignee: Intel Corporation, Santa Clara, Calif.

[21] Appl. No.: 580,726

[22] Filed: Dec. 29, 1995

[51] Int. Cl.⁶ ........................................................ G06F 9/46
[52] U.S. Cl. ............................................................ 395/376
[58] Field of Search ..................... 364/DIG. 1 MS File, 364/DIG. 2 MS File; 395/375, 700, 701, 705, 376, 561, 569, 570, 580, 591

[56] References Cited

PUBLICATIONS

Tom Swan "Mastering Turbo Pascal" Hayden Book Company, ISBN 0–8104–6287–7 (1986) pp. 294–298.

Primary Examiner—Robert B. Harrell
Attorney, Agent, or Firm—Duane, Morris & Heckscher LLP

[57] ABSTRACT

A microprocessor having registers is provided with a subset of instructions and is capable of operating in association with an operating system. The subset of instructions can be issued by an application running on the microprocessor for saving at least a portion of at least one of the plurality of registers not saved by the operating system during interrupt processing. Such an arrangement enables applications to be written for advanced microprocessors which have word lengths and register widths which exceed the word and register sizes for which the operating system was designed.

20 Claims, 4 Drawing Sheets

1

ASSISTING OPERATING-SYSTEM INTERRUPTS USING APPLICATION-BASED PROCESSING

BACKGROUND OF THE INVENTION

1. Field of the Invention

This invention relates to the field of computer architecture.

2. Description of the Related Art

The heart of all digital computers is the microprocessor. Typically, a microprocessor is a single-chip integrated circuit implementing a general-purpose central processing unit. It typically includes a controller to direct the execution of program instructions, registers to temporarily store control and data values and an arithmetic logic unit to calculate results. For example, referring to FIG. 1, a microprocessor 11 coupled by data bus 17 to program and data storage memory 12 and I/O ports 16 defining a microcomputer 10 is shown. The microprocessor includes control unit 13 for decoding instructions and sequencing the actions of other functional units. Control unit 13 also responds to internal and external interrupts. The arithmetic logic unit (ALU) 14 performs arithmetic and logic operations at times specified by control unit 13.

Registers 15 provide temporary, easily accessible storage for use by control unit 13. Registers typically are classified by function. Registers which typically are part of a microprocessor include general purpose or scratch pad registers, which hold values temporarily during computation, and dedicated registers. General purpose registers have no predefined functions and can be used by all programs. Dedicated registers have precisely defined functions to enable execution of instructions. For example, the program counter or program address register, is a register which keeps track of the address in memory of the next program instruction. The instruction register temporarily stores the current operation code instruction. The stack pointer holds the address of the next vacant location in the stack—a plurality of consecutive memory locations allocated for temporary storage of data in a sequential stacked arrangement. The status flag register is a register for storing status bits indicating whether various conditions are true or false. Other dedicated registers include the memory address register, the memory data register, the data counter and the index register. Different registers in a microprocessor may have different lengths (the number of bits stored) but typically the most common length is the word length of the computer.

An interrupt is an unexpected interruption of the microprocessor in executing a currently running program with instructions for it to perform some other task or execute some other program. For example, a peripheral device requiring service may generate an interrupt. Also, many operating systems employ preemptive multitasking in which tasks have predetermined periods within which to complete. If the task has not completed within the allotted time, the operating system is apt to interrupt the task and perform some other needed task or run some other program.

No matter what the source of the interrupt, a key to interrupt processing is the ability to cleanly and gracefully resume the interrupted program from the point of interruption. For example, an interrupt typically is processed as follows:

1. Receive interrupt instructions;
2. Complete current instruction;
3. Set aside contents of program counter and any registers needed by the routine which will service the interrupt request. This is typically accomplished by pushing the contents of these registers onto the stack.
4. Insert predetermined address (vector) into program counter;
5. Jump to interrupt service routine at location of address and execute;
6. Return from interrupt routine;
7. Restore (pop from stack) prior contents of program counter, and registers; and
8. Continue interrupted program.

Failure to set aside and restore the contents of the program counter and any other registers required by the interrupting program typically is fatal to graceful resumption of the interrupted program. The interrupting program may change the contents of these registers as it uses them for its own purposes. When the microprocessor returns for execution of the interrupted program, the foreign contents of the registers remaining from the interrupting program will prevent proper resumption of the interrupted program.

As noted, the length of registers used in a microprocessor typically are the same as the word length of the microprocessor. That is, the majority of registers on an 8-bit microprocessor are 8-bits long. Similarly, the length of most registers on 16-bit microprocessor are 16 bits long, etc. Furthermore, operating systems generally are written in the context of the microprocessor architecture on which they will run and are tailored to the particular word and register length provided by a microprocessor. The introduction of a new class of microprocessor having a larger word and register length generally requires the revision of an operating system or the preparation of a new operating system customized to take advantage of the increased word length and to work properly with applications written for the microprocessor having increased word length.

For example, assume operating system O is designed to run with microprocessor M1 having a word length W. Microprocessor M2 is introduced and has a word length of 2W. However, applications can not be written to fully take advantage of the new features, including the increased word length of microprocessor M2, because operating system O does not recognize the extended word and register length of microprocessor M2 and will not properly save them during an interrupt.

For example, microprocessor M1, for which O was written, has registers A, B, C, D . . . , and program counter PC, as well as other registers which are W bits long. Microprocessor M2 has registers AX, BX, CX, DX . . . program counter PC and other registers which are 2W bits long. An application A1 can be written for microprocessor M2 which can take advantage of the features of M2, such as by using words 2W bits long. These words will, for example during execution of A1, fill the AX, BX, CX, DX and other registers on M2. However, while application A1 is running on microprocessor M2 and operating system O, an interrupt, for example a preemptive multitasking call to run application A2, can be received. Operating system O will commence saving the present state of the program counter and registers for later resumption in the conventional manner. However, operating system O which was written for microprocessor M1, having word and register lengths of only W bits long, is unaware that the registers are 2W bits in length and "believes" that they are only W bits long. Operating system O will therefore only save half of the contents, for example, the lowest or least significant bits of, for example, the AX, BX, CX, DX . . . general purpose registers. Operating system O also might save only half of the contents of some dedicated registers, such as the program counter, when processing the interrupt in the general manner described above.

Microprocessor M2 and operating system O will commence running of the interrupting application, for example application A2, which can be called, for example, by a preemptive multitasking scheme. If the interrupting program A2 also is designed to take advantage of the extended word length of microprocessor M2, the higher order bits remaining in the AX, BX, CX, DX . . . general purpose registers, and perhaps the program counter and other registers, which were ignored and not saved by O, will in all likelihood be overwritten with the register values associated with the execution of the interrupting program or application A2. When the interrupting program or application A2 finishes running, or O otherwise switches back to A1, the lower order bits of the values associated with the state of application A1 saved from registers AX, BX, CX, DX, . . . and, in some embodiments the program counter and other dedicated registers will be restored in those registers by O. However, the upper order bits associated with application A2 will remain in those registers, since O did not earlier save those bits when the interrupt occurred because it did not know they existed. Application A1 will be prevented from gracefully resuming from the point of interruption, since the registers will not contain the same instructions or data which they held at the point of interruption of application A1. Application A1 will operate as if it was faulty, when in fact it might not be, and would generally be rendered useless. A similar fate likely awaits application A2 upon any attempted resumption of it.

The potential for occurrence of the above-identified problems prevents most application programmers from writing programs which fully utilize the capabilities of a new and improved microprocessor until the introduction of a new operating system designed to take advantage of the features of the new microprocessor, such as its increased word and register length.

A need exists, therefore, for a mechanism by which applications can fully use the advantages and features provided by new generation microprocessors without waiting for the publication of a new or revised operating system.

SUMMARY OF THE INVENTION

An extended computer architecture for running with an operating system has a microprocessor which includes a plurality of registers. A subset of instructions to the microprocessor are provided which can be issued by an application running on the microprocessor for saving at least a portion of at least one of the plurality of registers not saved by the operating system during interrupt processing.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1:
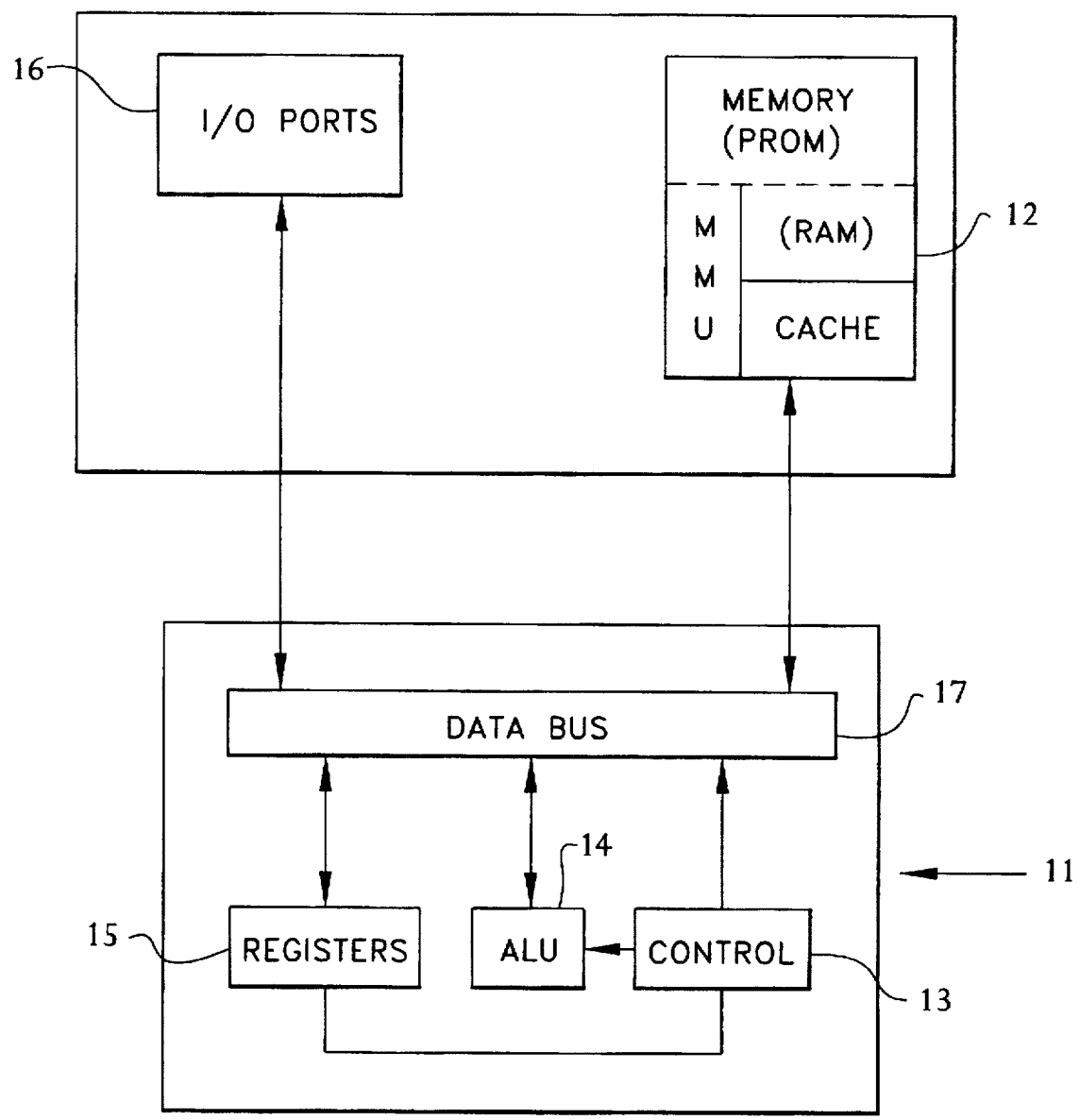
FIG. 1 is a block diagram of conventional microprocessor architecture.
Figure 2:
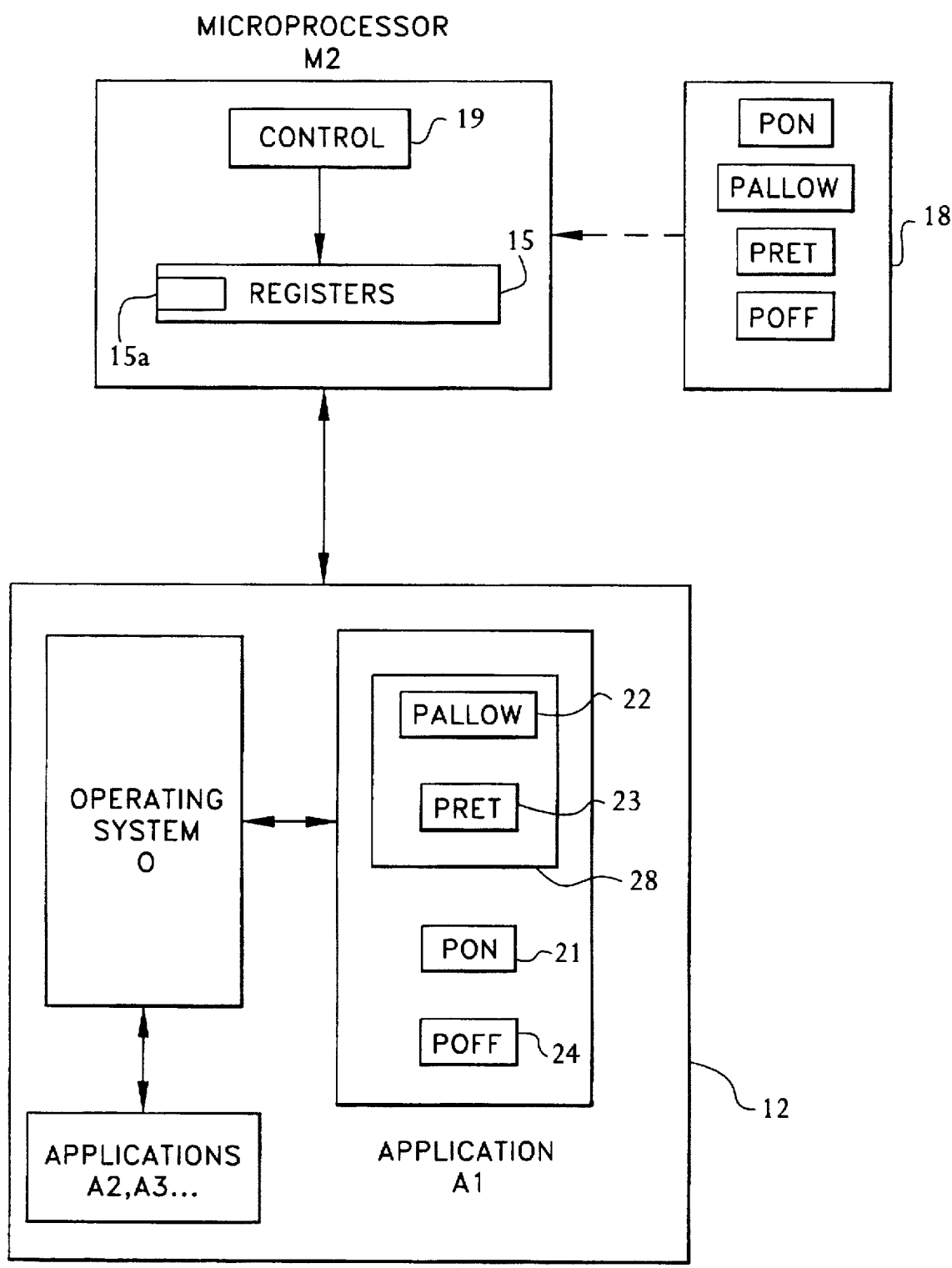
FIG. 2 is a block diagram of an embodiment of the invention.
Figure 3A:
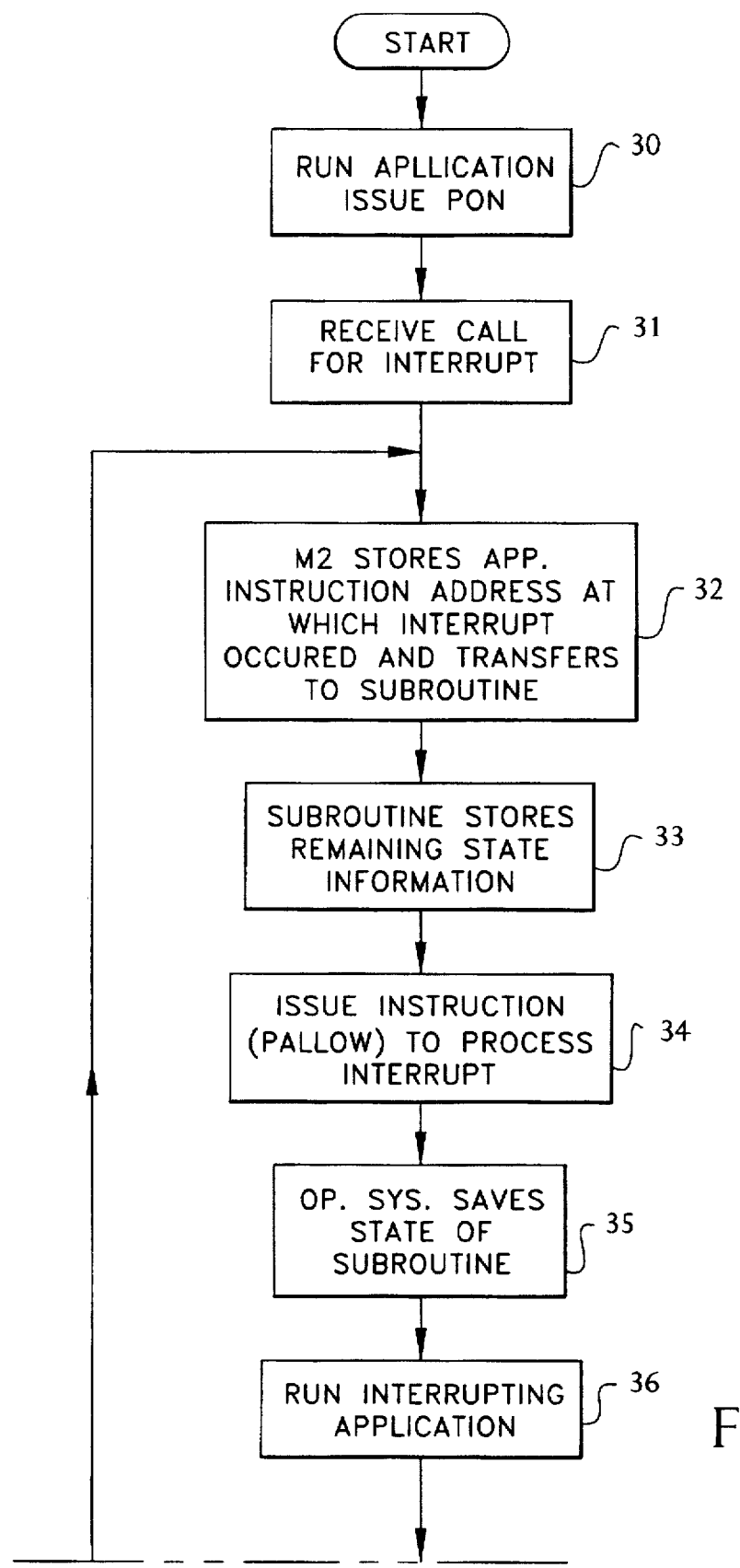
FIG. 3 is a flow chart of the processing of the preferred embodiment of the invention shown in FIG. 2.
Figure 3B:
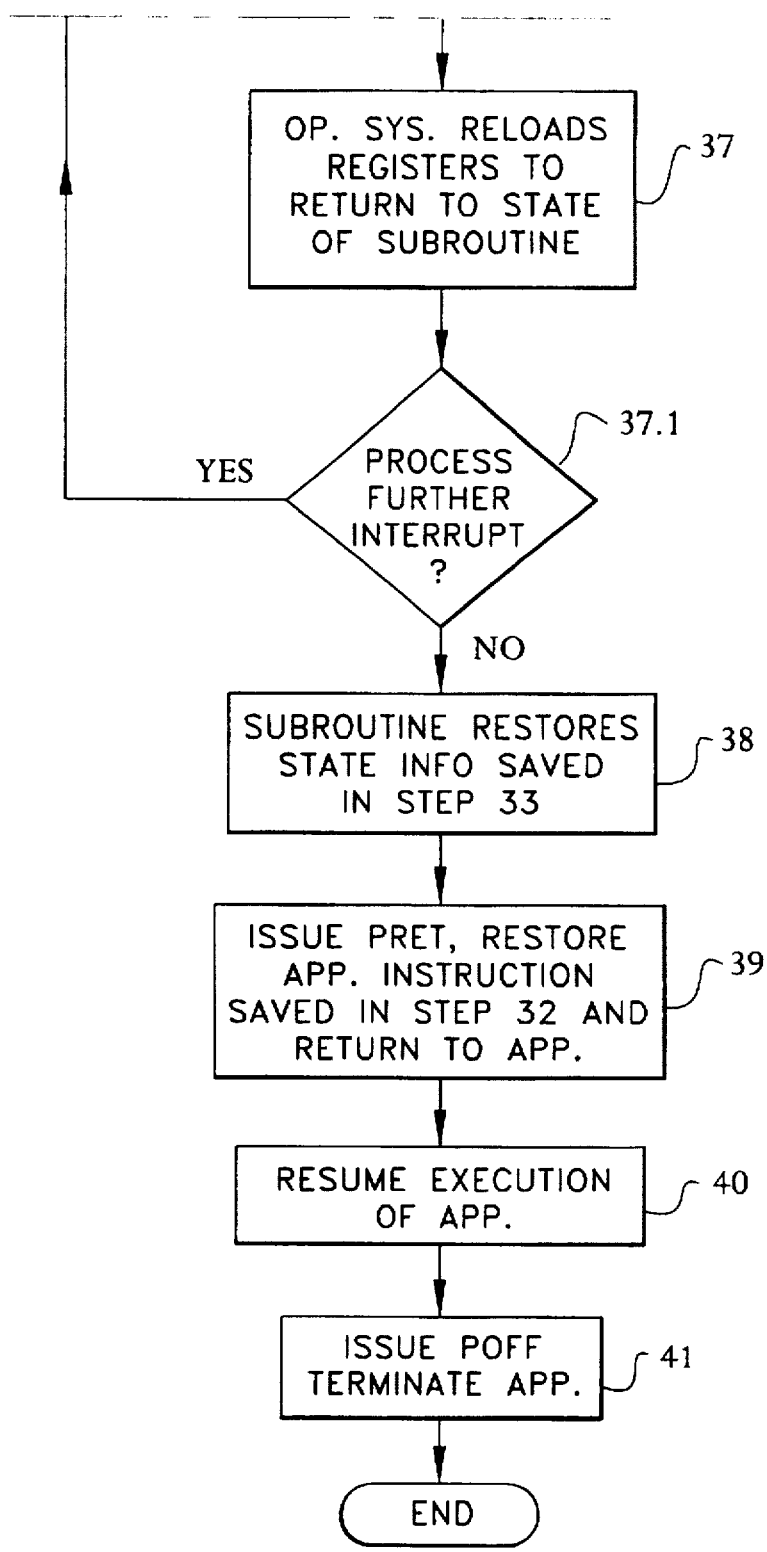

Referring now to FIGS. 2 and 3, the invention provides to an application a subset of the functionality that typically is found in an operating system, to take advantage of an improved microprocessor M2, running with operating system O. Operating system O may have been designed, for example, for microprocessor M1 or some other microprocessor not having the advanced features of microprocessor M2, such as extended word and register lengths.

As will be understood to those having ordinary skill in the art, M2 is designed to enable the continued running of applications written for microprocessor M1 and operating system O. Microprocessor M2 will emulate the behavior of microprocessor M1 until, for example, an application issues an instruction that is specific to M2, as will be explained below.

As noted above, microprocessor M2 may be operating in association with an operating system O, which may not have been designed to accommodate the expanded features of M2. In an embodiment, a subset of instructions 18 recognizable by, for example, control unit 13 of microprocessor M2 are part of the instruction set of microprocessor M2. The instruction subset 18 includes instructions such as PON, PALLOW, PRET and POFF. An application such as A1 may be designed to take advantage of the improvements associated with M2, such as the larger word and register sizes, even while running on operating system O. Such an application A1 which includes, for example, subroutine 28, includes preferably instructions from instruction subset 18. An application programmer having ordinary skill relying on this disclosure is capable of taking advantage of the new capabilities provided by microprocessor M2 in the manner disclosed herein since the application programmer will have access to the specifications of microprocessor M2, including an identification and explanation of instruction subset 18, which specifications were not available when operating system O was written.

Instruction subset 18 includes, for example, PON instruction 21. An application such as A1 running under operating system O but wishing to take advantage of the features of microprocessor M2 will issue PON instruction 21 during its initialization, i.e., PON instruction 21 is preferably part of the initialization code of application A1 (step 30 of FIG. 3). As will be evident to a person of ordinary skill, an application can be designed to use the advanced features of microprocessor M2, for example by including PON instruction 21 in its initialization code. PON instruction 21 loads PON-register 15a in register set 15 with the address of subroutine 28, which is part of application A1, and otherwise places microprocessor M2 in the advanced operating mode for which it was designed, for example in a mode which uses the extended word and register lengths, as will be understood by those having ordinary skill in the art. Typically, application A1 will load only a single address to subroutine 28 into PON register 15a and this address will remain until some other application, such as A2, which also is designed to use the extended features of microprocessor M2, changes the address. In one embodiment, a PON-active flag is set in, for example, a register in register set 15, after issuance of PON instruction 21, which signifies that the microprocessor is operating in a mode designed for taking full advantage of the additional capabilities of microprocessor M2, such as extended word and register lengths, and is not emulating operation of a less advanced microprocessor, such as microprocessor M1. Register set 15 further includes dedicated registers, such as the program counter, status flag register and stack pointer as well as general purpose registers, such as registers AX, BX, CX, DX . . . .

As application A1 is executing, an interrupt condition may occur and be presented to microprocessor M2 (step 31).

The PON-active flag is examined. If the PON-active flag is in a reset state, microprocessor M2 will treat the interrupt in the same manner as it would have been handled by microprocessor M1, as generally discussed above with respect to conventional microprocessor interrupts handling.

If the PON-active flag is set, such as by earlier, issuance of PON instruction 21, the address of the immediate, unexecuted instruction in application A1 is saved by microprocessor M2, typically onto a stack (step 32). Certain other dedicated registers, for example, the stack pointer and status flag registers also may be saved by M2 in association with the hardware processing of the interrupt. Microprocessor M2 will save the entire contents of these registers, such as onto a stack. In one embodiment, microprocessor M2 also loads a P-vector register, which can be part of register set 15, with the interrupt vector address. In an alternative embodiment, the interrupt vector address may be stored onto a stack. Microprocessor M2 obtains from PON-register 15a, the address of the next instruction to be executed, namely it obtains the address of subroutine 28 (step 32). The new behavior of this invention will commence as directed by subroutine 28. Normal processing of the interrupt is temporarily deferred.

A jump is made to subroutine 28 located at the address present in PON-register 15a as loaded by PON instruction 21. Although in conventional systems, an application is unaware of any interrupts, PON instruction 21 of the invention enables an application to be made aware of a call for an interrupt by providing an address of a subroutine in the application to the microprocessor which is called in the event of an interrupt. Subroutine 28 handles the interrupt in a special manner.

After the jump to subroutine 28 occurs (step 32), subroutine 28 begins running and saves the entire contents of the 2W bit long general purpose registers, such as AX, BX, CX, DX . . . (step 33). The full contents of these registers might not be saved by operating system O, which could be unaware of their extended length. By storing the entire contents of general purpose registers AX, BX, CX, DX, . . . , subroutine 28 fully preserves the remaining state information associated with interrupted application A1. The AX, BX, CX, DX, . . . register contents can be stored in a work memory associated with execution of application A1, but preferably are stored in a stack to allow for processing of multiple interrupts by the invention in the manner described below. Also stored is the contents of PON-register 15a, namely the address of subroutine 28.

After storing the 2W bit long registers, the subroutine issues PALLOW instruction 22 (step 34), which allows completion of interrupt processing by microprocessor M2 and operating system O in a normal fashion. PALLOW 22 uses the information concerning the original interrupt, such as its interrupt vector address, which was, for example, saved by microprocessor M2 in step 32, to report the interrupt as if it was just now occurring. Deferred processing of the interrupt commences. Operating system O obtains control of interrupt processing as if this was the point at which the interrupt occurred, without regard to the actions caused by PON instruction 21. Operating system O, for example, will save the lower W bits of the 2W bit wide registers of register set 15, such as the AX, BX, CX, DX, . . . , program counter and other registers, to save the state of the program it had been running immediately before receiving the deferred interrupt (step 35). What is saved is, in fact, the present state of subroutine 28, for example beginning with an instruction immediately following PALLOW instruction 22. Since operating system O has control at this point, and is capable of saving and restoring only registers having a word length W, it is important that subroutine 28 be located in a range of addresses understood by operating system O, such as those having a length W and typically associated with operation of microprocessor M2 in the microprocessor M1 emulation mode, so that it may be gracefully resumed from its point of interruption. Microprocessor M2 and Operating system O then will proceed to execute the interrupting program in the conventional manner and make use of all registers as is necessary for proper execution (step 36).

Eventually, as conventionally occurs, operating system O and microprocessor M2 will resume execution of application A1. For example, servicing of a hardware generated interrupt could finish or the application for which A1 was interrupted under a preemptive multitasking interrupt could itself be interrupted by a preemptive multitasking interrupt. In any event, operating system O will reload registers 15 (step 37), including the program counter, with the values saved in step 35 during the deferred processing of the interrupt. This will resume execution of subroutine 28, from a point just following PALLOW instruction 22, since that was the state of application A1 at the point of the deferred interruption. Subroutine 28 includes code at this point for commanding microprocessor M2 to reload (step 38) all of the 2W bit long general purpose registers from, for example, the work memory or stack in which they were stored during step 33. The contents of PON-register 15a also are reloaded with the address of subroutine 28, since PON-register 15a may have been overwritten with the address of a subroutine which is part of the interrupting application. This ensures that when application A1 is running, the PON-register 15a always holds the address of subroutine 28 associated with application A1, and not the address of a subroutine associated with another application which also is designed to use the full features of microprocessor M2 in the manner described above. Any subsequent interruption of application A1 (after it is resumed, as explained below) also will be processed by subroutine 28 in the deferred interrupt processing mode of the invention.

The reloading of the general purpose registers performed in step 38 fills the relevant registers with the values they had at the point of or immediately following the original occurrence of the interrupt. Therefore, even though operating system O is capable of saving and restoring only the lower W bits of the 2W bit long general purpose registers AX, BX, CX, DX . . . , application A1 can gracefully resume from its point of interruption because subroutine 28 has controlled the saving and restoring of all of the bits in these registers.

After subroutine 28 commands restoration of the 2W bit long general purpose registers in register set 15, it issues a PRET instruction 23 (step 39). The PRET instruction 23 causes microprocessor M2 to restore the contents of the program counter which were saved in step 32. This value restored is the address of the upcoming instruction in application A1, i.e., the instruction that would have executed earlier but for the interrupt. Microprocessor M2 will terminate running of subroutine 28 and return to the original state of application A1, just prior to its interruption, as dictated by the restored contents of all relevant registers in register set 15, for example, the program counter, which has been fully restored by the PRET command, and work registers AX, BX, CX, DX, . . . . At this point microprocessor M2 gracefully and apparently seamlessly resumes executing application A1 (step 40).

Preferably, further interrupts are inhibited while the invention processes an interrupt in the manner described above, at least until PALLOW processes the original interrupt in step 34. This prevents the stored interrupt vector address from being changed before it is used to service the original interrupt. PALLOW then will preferably enable all interrupts.

In one embodiment, a second interrupt may be processed by the invention (step 37.1) in the manner described above, for example, after O returns to subroutine 28 in step 37, but before issuance of a PRET instruction in step 39. As apparent to a person of ordinary skill, steps 32 through 40 will execute for the second interrupt before step 38 executes for the first interrupt. Because the relevant data from the first interrupt saved in steps 32, 33 and 35 preferably are pushed onto a stack, processing of the second interrupt does not interfere with this stored data. When step 40 executes for the second interrupt, the subroutine 28 of application A1 will resume running from, for example, the point at which it was interrupted by the second interrupt, since this was the address stored in step 32 during processing of the second interrupt. Eventually, step 40 will be reached for the first interrupt, at which point application A1 will resume from the point at which it originally was interrupted by the first interrupt.

The POFF instruction 24, like PON instruction 21 is part of application A1. The POFF instruction is issued by application A1 in association with its termination to signal the hardware that subroutine 28 is being removed from memory (step 41). The POFF instruction resets the PON-active flag. All future interrupts will be processed according to conventional interrupt processing methods, such as those associated with microprocessor M2 in its microprocessor M1 emulation mode, until receipt of another PON instruction. The PON-active flag typically also is reset on power-up As will be apparent to a person having ordinary skill in view of this disclosure, the invention permits the saving of all state information from an interrupted application, even though the operating system running the application is unaware that such state information exists. Furthermore, although the invention as described above supervises the saving of data from registers which are wider than known by the operating system, a person of ordinary skill will understand that this invention is equally applicable for supervising the saving of data from registers which are not even known by the operating system to exist.

As also will be apparent, subroutine 28 need only save in step 33 the portion of the general purpose registers not typically saved by operating system O, for example the upper W bits. Operating system O, as discussed above, generally will save in step 35 the portion of the general purpose registers which it knows to exist, for example, the lower W bits. Although subroutine 28 is running at the point of execution of step 35, it is unlikely that subroutine 28 will use the general purpose registers and, therefore, it will not have overwritten the contents of the general purpose registers prior to the step of saving (step 35). Therefore operating system 28 likely will save, and then restore to the general purpose registers in step 37, partial data values associated with the state of application A1 at the point of its interruption namely, for example, the lower W bits. In such an embodiment, subroutine 28 then need only restore the upper W bits in step 38.

Furthermore, the invention is not limited to gracefully resuming an application from a single interrupt, but is capable of gracefully resuming it from an unlimited number of sequential interrupts. Also, the invention permits more than one application to be gracefully resumed. For example, several multitasked applications, each provided with a subroutine similar to subroutine 28, may be gracefully resumed if interrupted.

Although references herein are made to register and words having widths and lengths of W and 2W bits, there is no limitation on the size of the registers in any microprocessor with which this invention may be used.

The invention allows application programmers to take full advantage of new, sophisticated microprocessors even before the introduction of operating systems designed to do the same. The invention provides the additional advantage of inducing application programmers to learn the architecture of freshly introduced microprocessors sooner, without waiting for the introduction of a completely compatible operating system, which introduction can occur years after the introduction of the advanced microprocessor.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A method for processing an interrupt on a computer, comprising the steps of:

(a) running an application on the computer;

(b) receiving a call from outside the application to interrupt running of the application; and (c) transferring interrupt-processing control to the application after receiving the call for the interrupt.

2. The method of claim 1, wherein the computer includes an operating system and step (c) further comprises the step of storing contents of at least one register, wherein the contents are not saved by the operating system during the interrupt and the contents are necessary for a graceful resumption of the application after the interrupt.

3. The method of claim 2, further comprising the steps of:

(d) executing a deferred interrupt;

(e) restoring the contents of the at least one register; and (f) resuming the application from a point of interruption.

4. The method of claim 3, wherein:

step (a) further comprises the step of loading at least one of the plurality of registers with an address of a subroutine in the application;

step (d) comprises the steps of:

(1) saving a state of the subroutine; and (2) restoring the state of the subroutine;

steps (e) and (f) are executed by the restored subroutine; and further comprising the step of deleting the address of the subroutine from the at least one of the plurality of registers.

5. The method of claim 1, wherein the computer is adapted to operate in an extended mode or a conventional mode and step (a) further comprises the step causing the computer to operate in the extended mode.

6. The method of claim 5, wherein the extended mode comprises at least one of 1) a register having a larger width than a register of the conventional mode and 2) a register not present in the conventional mode.

7. A computer-implemented method for switching between tasks being handled by an operating system and a processor, the processor having a conventional mode and an extended mode, the extended mode using registers and instructions of the conventional mode, comprising the steps of:

(a) advising an application of an impending task switch by the operating system away from the application; and (b) advising the application of an impending task switch by the operating system back to the application, wherein steps (a) and (b) occur independently of the operating system.

8. The method of claim 7, wherein step (a) further comprises the step of saving data associated with the extended mode.

9. The method of claim 8, wherein step (a) further comprises the step of delaying notification of the operating system by the processor of the impending task switch.

10. The method of claim 9, wherein the data saving and the delayed notification are enabled by the application.

11. The method of claim 8, wherein at least some of the data is in an extension of a conventional mode register associated with the extended mode.

12. The method of claim 8, wherein at least some of the data is in a register not present in the conventional mode.

13. The method of claim 7, wherein the operating system uses only the conventional mode.

14. The method of claim 7, wherein step (b) further comprises the step of delaying the task switch by the operating system until it is enabled by the application.

15. An application adapted to run on a processor having a plurality of registers, wherein an operating system running on the processor does not save all of the contents of all of registers of the processor during interrupts, wherein the application is adapted to issue a subset of instructions to the processor to ensure saving of all of the contents of all of the registers during each interrupt.

16. The invention of claim 15, wherein:

the processor is operable in either a conventional mode or an extended mode; and the subset of instructions comprises:

(1) an instruction to cause operation of the processor in the extended mode;

(2) an instruction to allow execution of a deferred interrupt; and (3) an instruction to resume the application from a point of interruption.

17. The invention of claim 16, wherein instruction (1) is adapted to load at least one of the plurality of registers with an address of a subroutine in the application, the subroutine being operable to control saving of the contents of the at least one register.

18. The invention of claim 17, wherein the subroutine is adapted to be called when the processor receives the interrupt.

19. The invention of claim 17, wherein:

instruction (2) is adapted to be issued by the subroutine in the application;

the processor stores a state of the subroutine during the execution of the deferred interrupt;

the processor restores the state of the subroutine at termination of the execution of the deferred interrupt;

the restored subroutine is adapted to issue a command to the processor to restore the contents of the at least one register;

the subroutine is adapted to issue an instruction from the subset of instructions to the processor for causing the processor to resume execution of the application from a point of interruption; and the address of the subroutine is deleted from the at least one of the plurality of registers when the application is unloaded from the processor.

20. The invention of claim 16, wherein the extended mode comprises at least one of 1) a register having a larger width than a register associated with operation in the conventional mode and 2) a register not present in the conventional mode.

* * * * *